United States Patent
Henry (10) Patent No.: US 11,863,805 B2
(45) Date of Patent: Jan. 2, 2024

(54) SYSTEMS AND METHODS FOR PRESERVING VIDEO STREAM QUALITY

(71) Applicant: Meta Platforms, Inc., Menlo Park, CA (US)

(72) Inventor: Colleen Kelly Henry, Oakland, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/349,485

(22) Filed: Jun. 16, 2021

(65) Prior Publication Data

US 2022/0408123 A1    Dec. 22, 2022

(51) Int. Cl.
*H04N 21/234* (2011.01)
*H04N 21/24* (2011.01)

(52) U.S. Cl.
CPC ....... *H04N 21/234* (2013.01); *H04N 21/2407* (2013.01)

(58) Field of Classification Search
CPC ............... H04N 21/2345; H04N 21/2407
See application file for complete search history.

(56) References Cited

U.S. PATENT DOCUMENTS

| | | | |
|---|---|---|---|
| 10,708,654 B1 | 7/2020 | Moraghan et al. | |
| 2007/0180119 A1* | 8/2007 | Khivesara | H04L 47/70 709/226 |
| 2009/0025027 A1* | 1/2009 | Craner | H04N 21/2385 725/116 |
| 2009/0193485 A1 | 7/2009 | Rieger et al. | |
| 2010/0125887 A1* | 5/2010 | Evans | H04N 21/2402 725/114 |
| 2013/0064287 A1* | 3/2013 | Karlsson | H04N 19/42 375/E7.126 |
| 2013/0215213 A1* | 8/2013 | Power | H04L 65/611 348/14.02 |
| 2015/0178370 A1 | 6/2015 | Shabtai et al. | |

(Continued)

FOREIGN PATENT DOCUMENTS

WO    2020263024 A1    12/2020

OTHER PUBLICATIONS

Carlsson N., et al., "Optimized Adaptive Streaming of Multi-video Stream Bundles," IEEE Transactions on Multimedia, vol. 19, No. 7, Jul. 1, 2017, pp. 1637-1653.

(Continued)

*Primary Examiner* — Chenea Davis
(74) *Attorney, Agent, or Firm* — Greenberg Traurig, LLP (57) ABSTRACT

A computer-implemented method for preserving video stream quality may include (i) identifying a plurality of video streams being transmitted via a shared connection with limited bandwidth, (ii) determining that viewership of a video stream within the plurality of video streams falls below a popularity threshold, (iii) increasing bandwidth availability for a remainder of the plurality of video streams by ceasing transmission of the video stream with the viewership that falls below the popularity threshold, and (iv) continuing to transmit the remainder of the plurality of video streams via the shared connection with the limited bandwidth. Various other methods, systems, and computer-readable media are also disclosed.

20 Claims, 7 Drawing Sheets

(56) References Cited

U.S. PATENT DOCUMENTS

2016/0381431 A1\* 12/2016 Patterson ................ H04L 67/02
                                                       725/110
2019/0245749 A1    8/2019 Bowen et al.

OTHER PUBLICATIONS

International Search Report and Written Opinion for International Application No. PCT/US2022/030418, dated Aug. 24, 2022, 12 pages.

\* cited by examiner

SYSTEMS AND METHODS FOR PRESERVING VIDEO STREAM QUALITY

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for facilitating the streaming and/or upload of video or other media at optimal quality in real time by transmitting streams based on importance, popularity and/or resolution. In many cases, streaming video of a live event may be transmitted via channels with limited, variable, and/or unstable bandwidth, such as a shared internet connection, a mobile data connection, a microwave link, a wi-fi network, satellite uplink, freespace optics, another Internet Protocol connectivity type, or a combination there of. To provide the best quality (e.g., of viewing experience) at any point by adapting optimally to fluctuations in bandwidth, the systems described herein may temporarily cease transmitting less popular and/or higher-resolution streams when available bandwidth decreases (e.g., beyond the amount required to transmit all streams at sufficient bit rates) and may resume transmitting these streams when available bandwidth recovers.

In some embodiments, the systems described herein may use real-time popularity metrics. For example, if multiple streams (e.g., of different camera angles) of a live sporting event are being broadcast and available bandwidth decreases, the system may cease transmitting the streams being watched by fewer viewers in order to maintain quality on the streams that are being watched by more viewers. In other examples, the systems described herein may use predicted popularity metrics to determine which streams to drop. Additionally or alternatively, the systems described herein may drop streams based on resolution. For example, if the systems described herein are transmitting multiple streams of the same camera angle at different resolutions and/or bitrates and available bandwidth decreases, the systems described herein may cease transmitting the highest-resolution stream in order to preserve the quality of all remaining streams rather than continue transmitting streams at every resolution at degraded quality. In some embodiments, the systems described herein may cease and resume transmitting streams at segment boundaries (e.g., may transmit a complete segment, avoid transmitting the next several segments in response to a decrease in bandwidth, then resume transmitting at the start of a segment). In some examples, the systems described herein may backfill segments with higher-resolution video after the event is over to create a recording with a consistent resolution.

In some embodiments, the systems described herein may improve the functioning of a computing device by enabling the computing device to transmit streams at the best possible quality given fluctuations in available bandwidth. Additionally, the systems described herein may improve the fields of video streaming and/or live video broadcasting by facilitating a better viewing experience with consistent quality.

Figure 1:
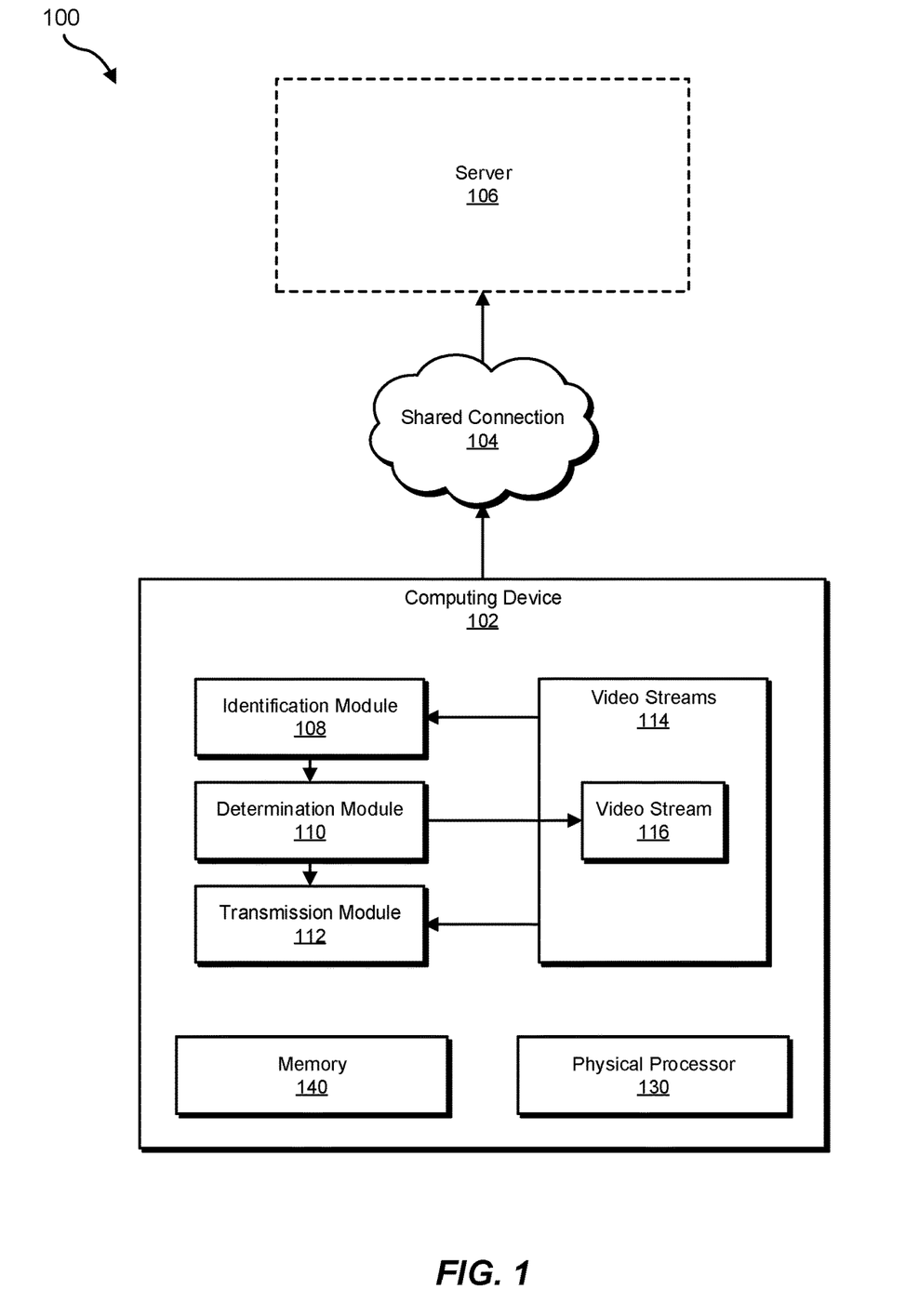
FIG. 1 is a block diagram of an exemplary system for preserving video stream quality.

In some embodiments, the systems described herein may operate an endpoint computing device. Additionally or alternatively, the systems described herein may operate on a local server (e.g., a server that is connected to one or more endpoint computing devices and/or cameras via a local area network). FIG. 1 is a block diagram of an exemplary system 100 for preserving video stream quality. In one embodiment, and as will be described in greater detail below, a computing device 102 may be configured with an identification module 108 that may identify a plurality of video streams 114 being transmitted via a shared connection 104 with limited bandwidth. In some embodiments, a determination module 110 may determine that viewership of a video stream 116 within video streams 114 falls below a popularity threshold. In some examples, a transmission module 112 may increase bandwidth availability for the remainder of video streams 114 by ceasing transmission of video stream 116 while continuing to transmit the remainder of video streams 114 via shared connection 104.

Computing device 102 generally represents any type or form of computing device capable of reading computer-executable instructions. For example, computing device 102 may represent an endpoint computing device. In other examples, computing device 102 may represent a server. Additional examples of computing device 102 may include, without limitation, a laptop, a desktop, a wearable device, a smart device, an artificial reality device, a personal digital assistant (PDA), etc.

In some embodiments, computing device 102 may transmit video streams 114 to a server 106. In some embodiments, server 106 may be a remote server (e.g., a server that is not connected to computing device 102 by a local area network and/or that is in a separate physical location from computing device 102). Server 106 generally represents any type or form of backend computing device that may process video streams for storage, download, and/or other purposes.

Examples of server 106 may include, without limitation, application servers, database servers, and/or any other relevant type of server. Although illustrated as a single entity in FIG. 1, server 106 may include and/or represent a group of multiple servers that operate in conjunction with one another.

Video streams 114 generally represent any set of video streams being transmitted via a shared connection. In some examples, video streams 114 may be related. For example, video streams 114 may all be real-time streams of the same live event from different camera angles and/or at different resolutions. In other examples, video streams 114 may be unrelated in subject matter. For example, video streams 114 may be a collection of movies stored on a group of servers that share a network connection.

Shared connection 104 generally represents any type or form of connection between computing devices with limited bandwidth (i.e., a limit on the amount of data that can be transmitted via the connection at any given time). In some embodiments, shared connection 104 may represent a network connection. In one embodiment, shared connection 104 may represent a wireless network connection such as a satellite uplink, a wi-fi network connection, and/or any other type of network connection not facilitated by physical cables, conduits, or wires. In some examples, shared connection 104 may be subject to bandwidth fluctuations that may increase or decrease the available bandwidth at different times. For example, shared connection 104 may also be used by other non-video-streaming applications that may consume the available bandwidth and/or may be subject to external conditions (e.g., vehicles moving in front of the transmitter) that may temporarily reduce bandwidth.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
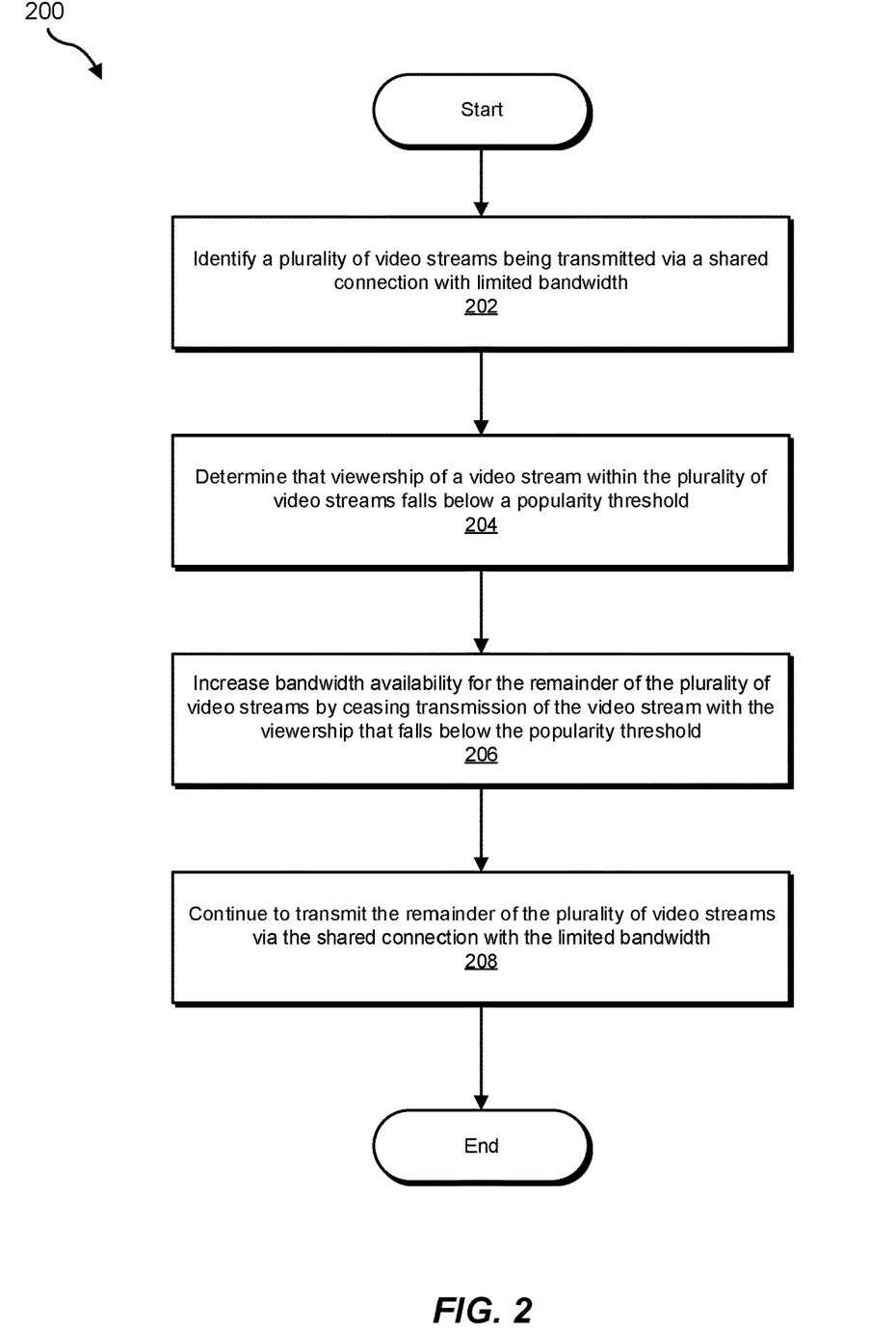
FIG. 2 is a flow diagram of an exemplary method for preserving video stream quality.

FIG. 2 is a flow diagram of an exemplary method 200 for preserving video stream quality. In some examples, at step 202, the systems described herein may identify a plurality of video streams being transmitted via a shared connection with limited bandwidth. For example, identification module 108 in FIG. 1 may, as part of computing device 102, identify video streams 114 being transmitted via shared connection 104.

Identification module 108 may identify the video streams in a variety of contexts. In some examples, the video streams may be real-time video of a live event. For example, the video streams may be different camera angles of a sporting event. In another example, the video streams may be different virtual camera angles within an artificial reality game.

At step 204, the systems described herein may determine that viewership of a video stream within the plurality of video streams falls below a popularity threshold. For example, determination module 110 in FIG. 1 may, as part of computing device 102, determine that viewership of a video stream 116 within video streams 114 falls below a popularity threshold.

Determination module 110 may determine that the viewership of a stream falls below a popularity threshold in a variety of ways. In some embodiments, determination module 110 may determine that the video stream has the lowest viewership (i.e., the fewest users and/or devices actively viewing and/or downloading the stream) out of all the video streams. Additionally or alternatively, determination module 110 may determine that the viewership of the video stream falls below a predetermined number of users (e.g., 10 users, 100 users, 500 users, etc.) and/or a predetermined percentage of total viewership of the video streams (e.g., 0.5%, 1%, 5%, etc.).

At step 206, the systems described herein may increase bandwidth availability for the remainder of the plurality of video streams by ceasing transmission of the video stream with the viewership that falls below the popularity threshold. For example, transmission module 112 in FIG. 1 may, as part of computing device 102, increase bandwidth availability for the remainder of video streams 114 by ceasing transmission of video stream 116.

In some embodiments, transmission module 112 may cease transmitting video stream 116 in response to detecting that the limited bandwidth for the shared connection has decreased. In some embodiments, detecting that the limited bandwidth for the shared connection has decreased may include determining that the limited bandwidth has decreased to below a predetermined threshold for available bandwidth. The threshold may be a percentage of maximum bandwidth (e.g., 95%, 90%, etc.) and/or a set bandwidth amount. For example, if a connection with 100 megabytes (MB) of bandwidth decreases to 99 MB, the systems described herein may not cease transmitting any streams. However, if the connection drops to 90 MB, the systems described herein may cease transmitting a stream.

Additionally or alternatively, the systems described herein may cease transmitting one or more streams in response to calculating that a quality level of the video streams will be reduced if all of video streams are transmitted via the decreased bandwidth. For example, if the connection has 100 megabits per second of available bandwidth and the video streams consume 70 megabits per second of bandwidth, a decrease to 80 megabits per second of available bandwidth will not decrease the quality of any streams and therefore does not necessitate ceasing transmission of any streams to preserve quality. However, if the available bandwidth decreases to 60 megabits per second, the systems described herein may calculate that the quality of the video streams will be reduced unless the systems described herein cease transmitting one or more streams. In some embodiments, the systems described herein may calculate whether the remaining available bandwidth is sufficient to continue transmitting each stream at an optimal and/or sufficient bit rate for the complexity of content within the stream.

In some embodiments, the systems described herein may cease transmitting video stream 116 but may continue recording, storing and/or caching video stream 116. For example, the systems described herein may cease transmitting a high-resolution video stream but may continue recording the high-resolution video stream for later editing and/or playback.

In some embodiments, the systems described herein may cease transmitting streams of other media types. For example, if a video stream is being transmitted with multiple audio streams (e.g., sports commentary by different commentators) and an audio stream has few or no listeners, the systems described herein may cease transmitting the audio stream in order to conserve bandwidth.

At step 208, the systems described herein may continue to transmit the remainder of the plurality of video streams via the shared connection with the limited bandwidth. For example, transmission module 112 in FIG. 1 may, as part of computing device 102, continue to transmit the remainder of video streams 114 via shared connection 104.

Figure 3A:
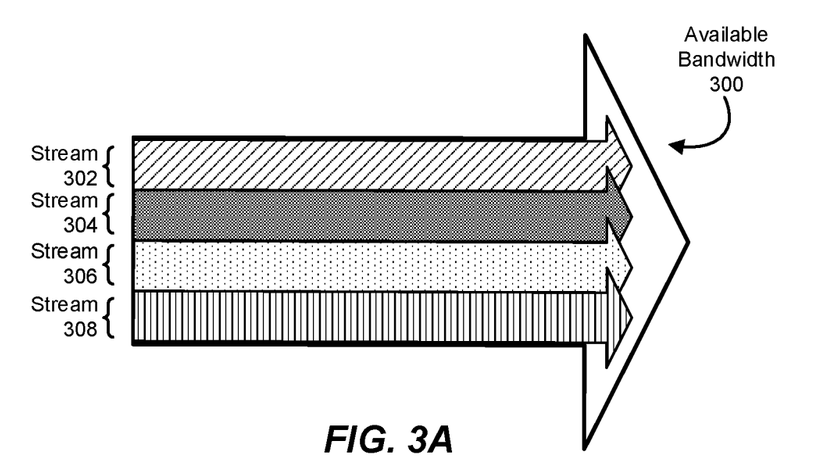
FIGS. 3A, 3B, and 3C are illustrations an exemplary system for preserving video stream quality during a decrease in available bandwidth.
Figure 3B:
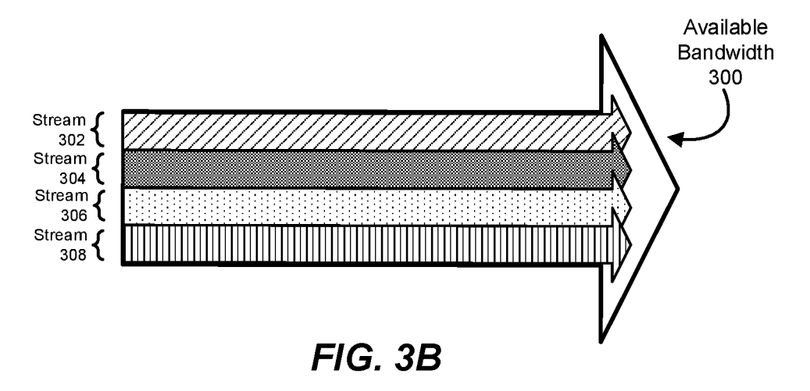
Figure 3C:
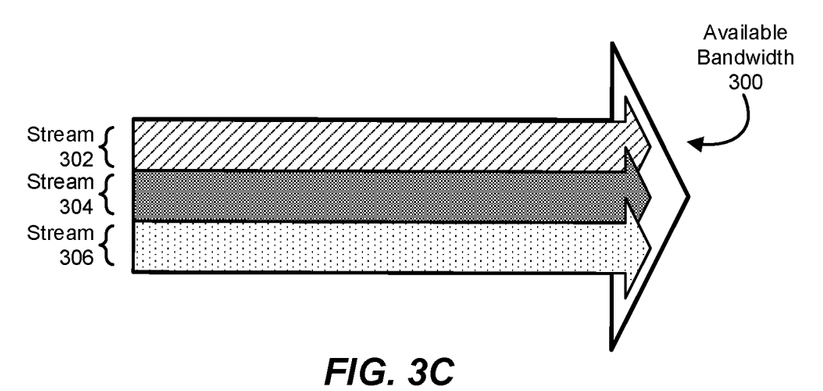

In some examples, the systems described herein may cease transmitting one or more video streams to preserve the quality of other video streams due to a decrease in available bandwidth. For example, as illustrated in FIG. 3A, streams 302, 304, 306, and/or 308 may each consume equal shares of available bandwidth 300. If available bandwidth 300 decreases, as illustrated in FIG. 3B, each stream may be begin to stall and/or rebuffer. In some systems, the encoder may react to this by reducing the bitrate of the contribution stream, resulting in under-allocation of bits, causing a visible decline in quality. This decline in quality may also be "burned in" to the resulting stream or transcoded streams. Instead, with adaptive contribution and backfill, rather than allowing all streams to decrease in quality, the systems described herein cease transmitting one version, such as one of multiple available bitrates or quality layers of a stream, as illustrated in FIG. 3C, so that the remaining streams may continue being transmitted with correct bit allocation given the reduced bandwidth available.

In one example, the systems described herein may encode and/or transmit a 1080p stream at five megabits and a 720p stream of the same content at three megabits. If available bandwidth decreases below eight megabits, the systems described herein may stop transmitting the 1080p stream at five megabits for a period of time, causing the video player on the client to adapt to 720p (at three megabits), maintaining the 720p stream with proper bit allocation rather than continuing transmitting both streams while under-allocating bits. In some examples, encoding a stream at a lower spatial resolution than the source content or the destination display, then scaling it up at the time of playback after decoding, may result in a better quality picture than using the same number of bits at the source resolution. In some examples, by preventing the downscaled, encoded, and upscaled video from being encoded with an under allocation of bits, the systems described herein may provide the viewer with a comparatively good-looking soft picture rather than a high-resolution but blocky picture.

Figure 4:
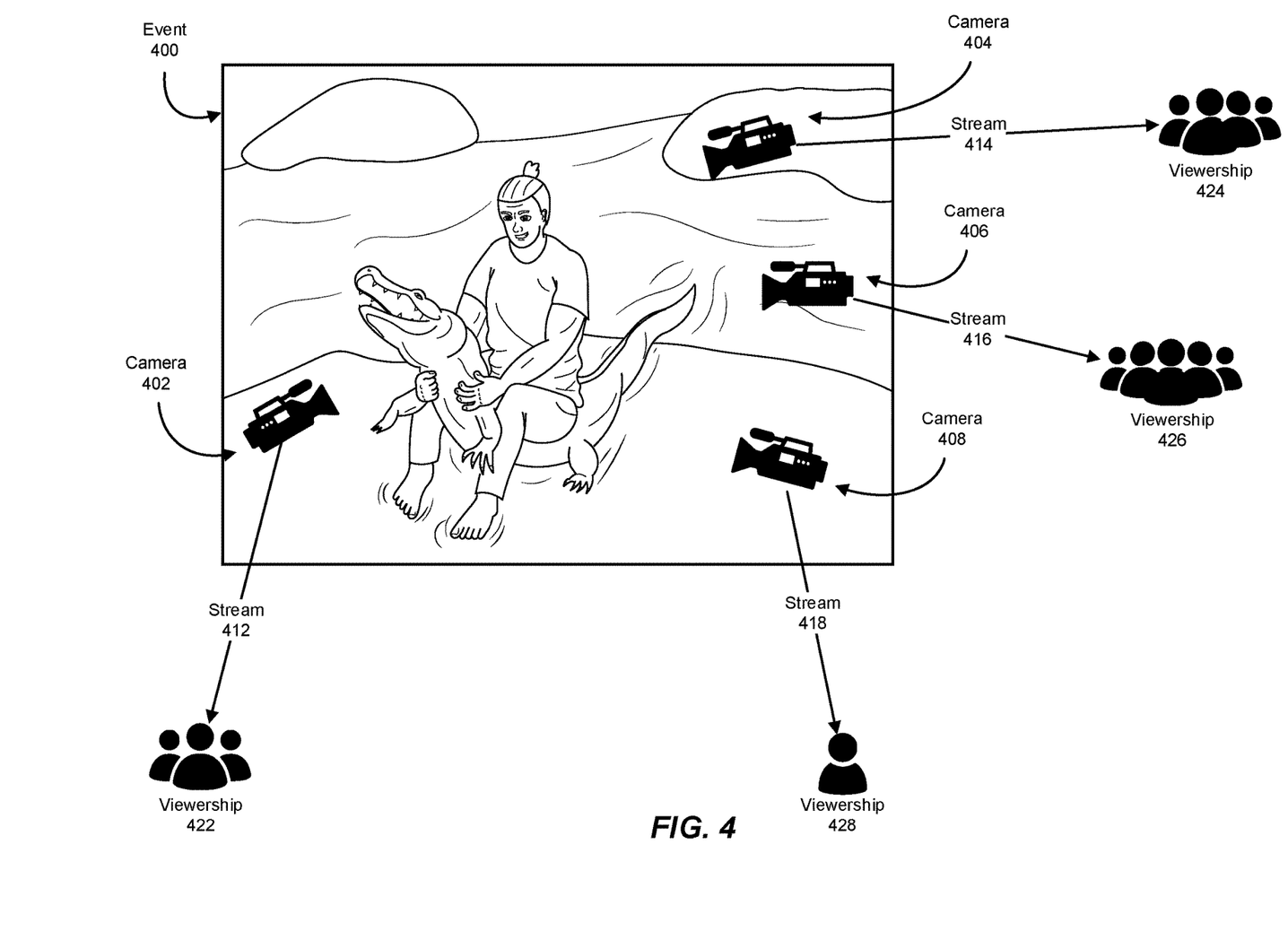
FIG. 4 is an illustration of an exemplary set of video streams with different viewership.

In some examples, each stream may represent a different camera angle of an event and viewers may have the option to watch the camera angle of their choice. For example, as illustrated in FIG. 4, event 400 may be a live alligator wrestling competition. In one example, a camera 402 may capture a stream 412 viewed by a viewership 422, a camera 404 may capture a stream 414 viewed by a viewership 424, a camera 406 may capture a stream 416 viewed by a viewership 426, and/or a camera 408 may capture a stream 418 viewed by a viewership 428. In some examples, the alligator wrestling competition may be located in a remote area and may be broadcast via an unreliable satellite uplink. In one example, if the satellite uplink experiences reduced available bandwidth, the systems described herein may determine that viewership 428 is the lowest viewership and may therefore temporarily cease transmitting stream 418 in order to preserve the quality of streams 412, 414, and/or 416. In some examples, the systems described herein may later resume transmitting stream 418 if available bandwidth increases.

Figure 5:
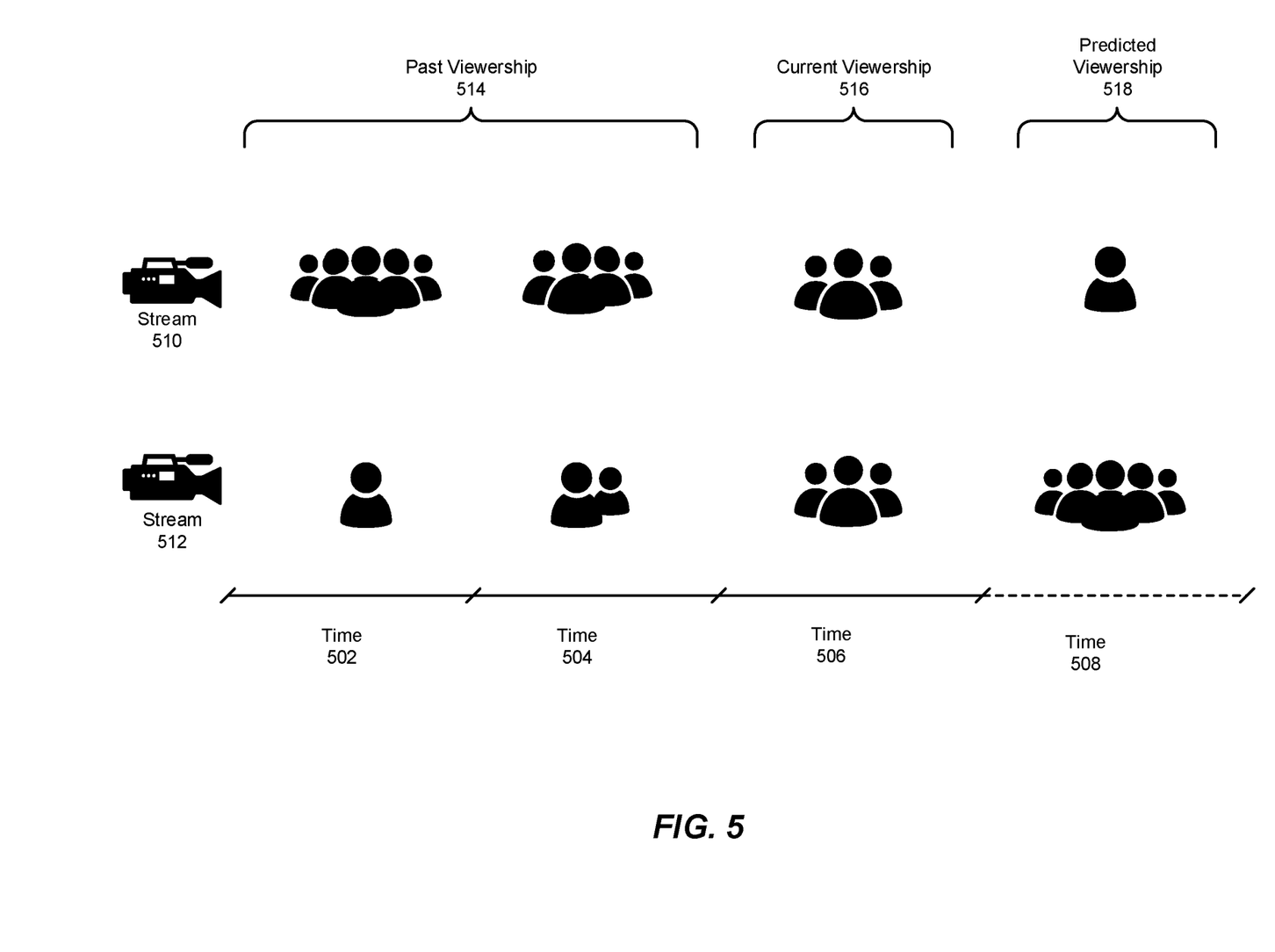
FIG. 5 is an illustration of an exemplary set of video streams with different viewership over time.

In some embodiments, the systems described herein may determine the stream with the lowest viewership based in part on an expected near-future popularity of the stream. In some examples, the systems described herein may predict future viewership based on past viewership and/or viewership trends. For example, as illustrated in FIG. 5, a stream 510 and/or a stream 512 may have changing viewership at times 502, 504, and/or 506. In one example, stream 510 may have the same current viewership 516 as stream 512, but past viewership 514 may indicate that stream 510 has decreasing viewership while stream 512 has increasing viewership. In one example, the systems described herein may calculate that predicted viewership at 518 at near-future time 508 (e.g., within the next minute, five minutes, half hour, etc.) will be lower for stream 510 than stream 512. In some examples, the systems described herein may cease transmitting stream 510 in response to predicting that the expected popularity of stream 510 falls below a popularity threshold.

Additionally or alternatively, the systems described herein may make predictions about future viewership based on other information besides or in addition to recent viewership trends. In some examples, the systems described herein may make predictions based on historical data and/or the context of the video streams. For example, if the streams are different cockpit cameras for automobiles in an automobile race, the systems described herein may have historical data suggesting that the cockpit cameras for the first two cars have the highest viewership and the cockpit cameras for cars in the middle of the pack have the lowest viewership, so a stream from the cockpit camera of a car that was in second position but falls behind can be predicted to experience a drop in viewership. In another example, the systems described herein may be configured to expect that a wide-angle view of a football field will experience an increase in viewership during the halftime show, and so the systems described herein may predict that the wide-angle camera stream will increase in viewership at the start of halftime and should continue being transmitted if halftime will start shortly, even if viewership of that stream is currently low.

Figure 6:
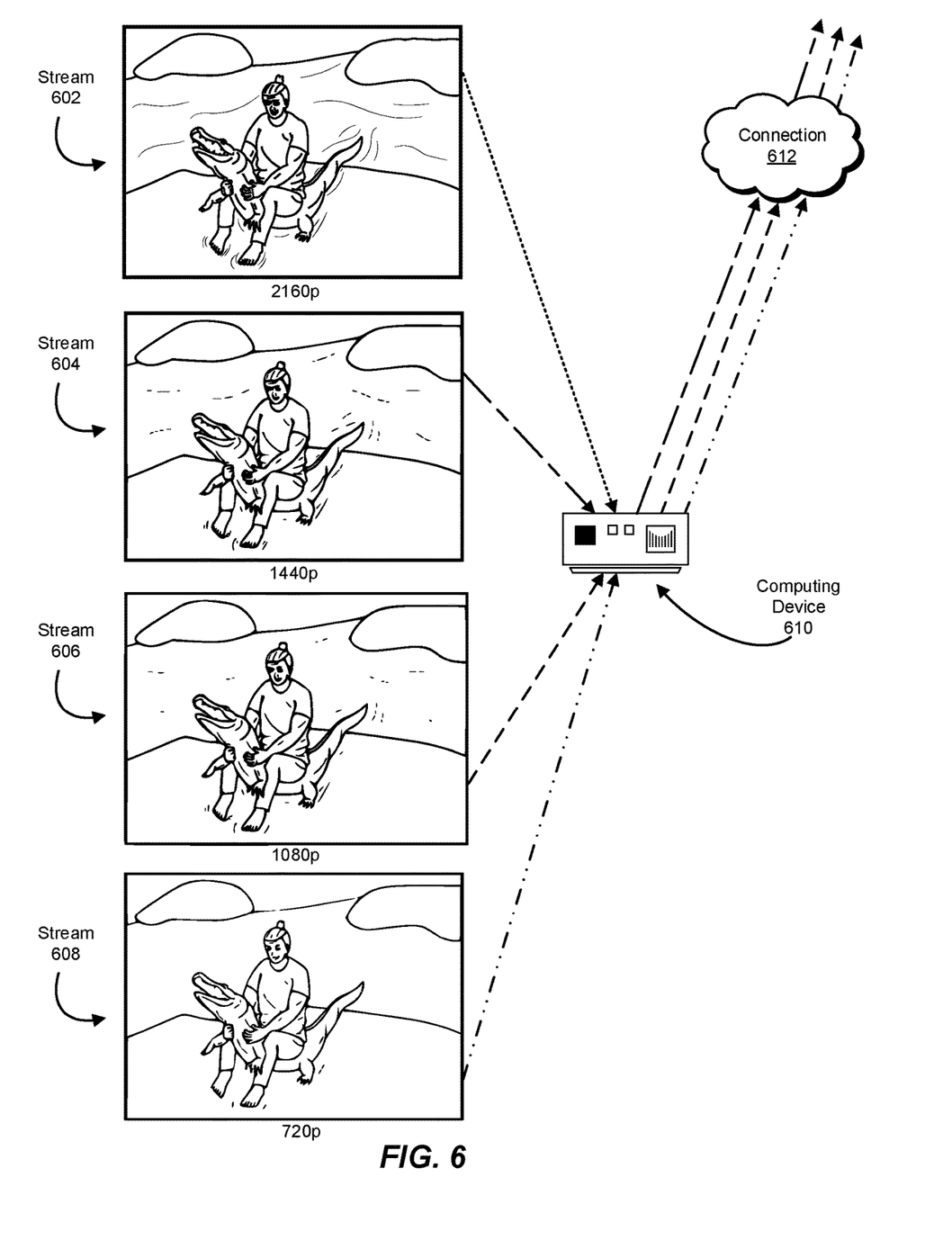
FIG. 6 is an illustration of an exemplary set of video streams of different resolutions.

In addition or as an alternative to streams being captured by different cameras, in some examples, the different video streams may include streams from the same camera captured and/or encoded at different qualities and/or resolutions. For example, as illustrated in FIG. 6, a stream 602 may be encoded at 2160p, a stream 604 may be encoded at 1440p, a stream 606 may be encoded at 1080p, and/or a stream 608 may be encoded at 720p. In some examples, a computing device 610 may transmit streams 602, 604, 606, and/or 608 via a connection 612 with limited bandwidth. In one example, if connection 612 experiences a decrease in bandwidth, the systems described herein may cease transmitting stream 602 (the highest-resolution stream) in order to preserve the quality of streams 604, 606, and/or 608. In some embodiments, viewers of stream 602 may be automatically switched to stream 604 (the stream of the next-highest resolution) when stream 602 ceases transmission.

Figure 7:
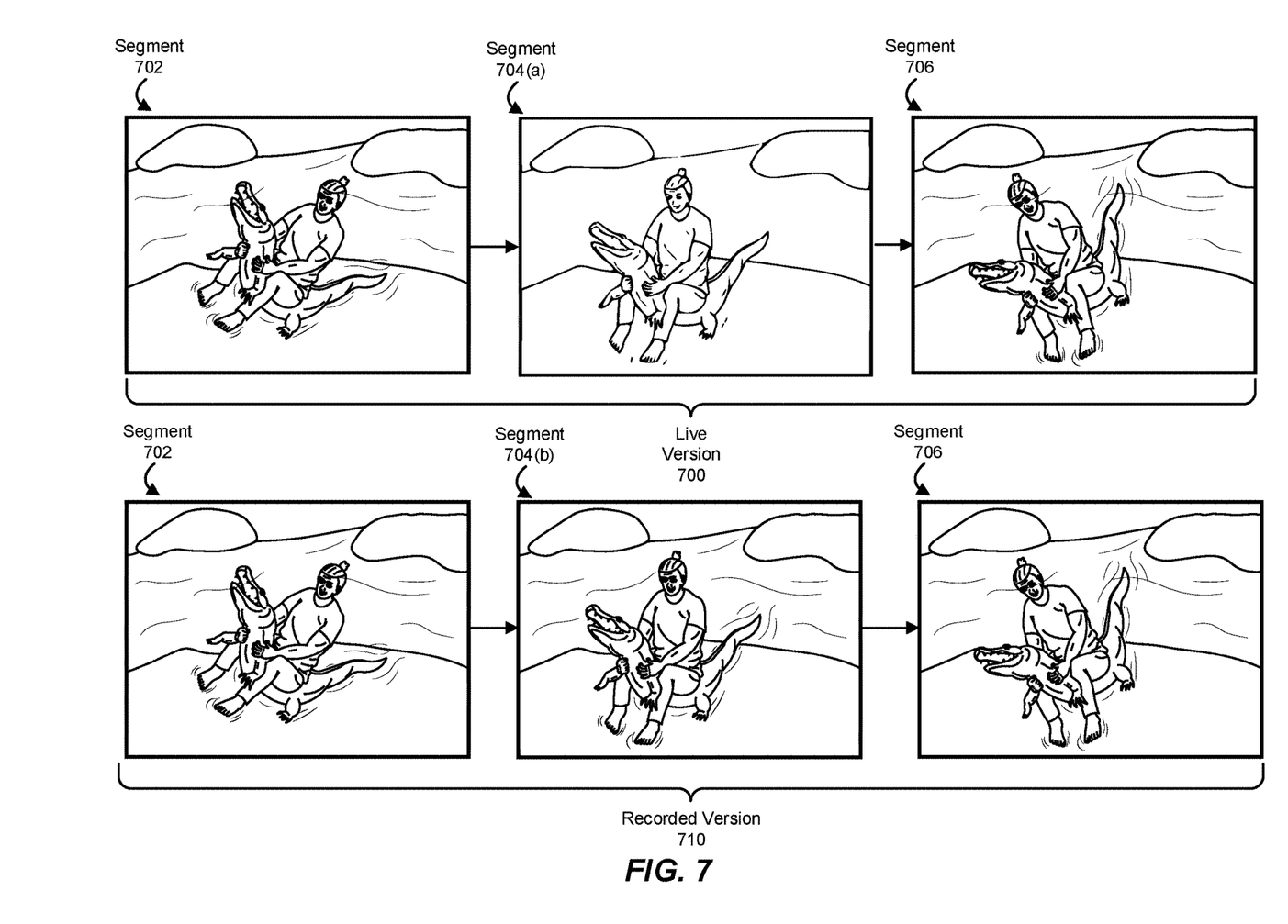
FIG. 7 is an illustration of an exemplary system for preserving video stream quality while creating a high-quality video recording.

In some examples, the systems described herein may continue recording a stream that is not being transmitted and may later backfill a recording of the event with the recorded stream data. For example, as illustrated in FIG. 7, a live version 700 of an event may have a segment 702 transmitted at a high resolution, a segment 704(a) transmitted at a lower resolution (e.g., because the systems described herein temporarily ceased transmitting the high-resolution stream), and a segment 706 transmitted at the original high resolution. In one example, a recorded version 710 of the event may replace segment 704(a) with a segment 70b(b) recorded at the higher resolution but not transmitted during the live event due to bandwidth constraints. In this way, the systems described herein may create a recorded version of an event with a consistent quality despite available bandwidth fluctuations during the event.

As described above, the systems and methods described herein may improve the experience of viewers of streaming video by preserving the quality of video streams despite limited and/or fluctuating bandwidth. By temporarily ceasing to transmit less-popular streams, the systems described herein may improve the viewing experience for the majority of viewers at the cost of temporarily inconveniencing a few viewers by forcing them to switch to a more popular stream. Similarly, by ceasing to transmit the highest-resolution stream, the systems described herein may avoid under allocating bits relative to the given complexity of content and therefore preserve quality across all remaining streams, resulting in an improved viewing experience for all viewers compared to viewing a nominally high-resolution but degraded stream.

Example Embodiments

Example 1: A method for preserving video stream quality may include (i) identifying a plurality of video streams being transmitted via a shared connection with limited bandwidth, (ii) determining that viewership of a video stream within the plurality of video streams falls below a popularity threshold, (iii) increasing bandwidth availability for a remainder of the plurality of video streams by ceasing transmission of the video stream with the viewership that falls below the popularity threshold, and (iv) continuing to transmit the remainder of the plurality of video streams via the shared connection with the limited bandwidth.

Example 2: The computer-implemented method of example 1, where determining that the viewership of the video stream within the plurality of video streams falls below the popularity threshold includes determining that the video stream has the lowest viewership out of all video streams in the plurality of video streams.

Example 3: The computer-implemented method of examples 1-2, where determining that the viewership of the video stream within the plurality of video streams falls below the popularity threshold includes determining that the viewership of the video stream falls below at least one of a predetermined number of users or a predetermined percentage of total viewership of the plurality of video streams.

Example 4: The computer-implemented method of examples 1-3, where determining that the viewership of the video stream within the plurality of video streams falls below the popularity threshold includes predicting an expected near-future popularity of the video stream and determining that the expected near-future popularity of the video stream falls below the popularity threshold.

Example 5: The computer-implemented method of examples 1-4, where increasing the bandwidth availability for the remainder of the plurality of video streams by ceasing transmission of the video stream is in response to detecting that the limited bandwidth for the shared connection has decreased.

Example 6: The computer-implemented method of examples 1-5, where detecting that the limited bandwidth for the shared connection has decreased includes determining that the limited bandwidth has decreased to below a predetermined threshold for available bandwidth.

Example 7: The computer-implemented method of examples 1-6, where detecting that the limited bandwidth for the shared connection has decreased includes calculating that a quality level of the plurality of video streams will be reduced if an entirety of the plurality of video streams are transmitted via the decreased bandwidth.

Example 8: The computer-implemented method of examples 1-7 may further include identifying a high-resolution video stream that has a highest resolution within the plurality of video streams and increasing bandwidth availability by ceasing transmission of the high-resolution video stream.

Example 9: The computer-implemented method of examples 1-8, where the plurality of video streams include a plurality of real-time video streams of a live event.

Example 10: A system for preserving video stream quality may include at least one physical processor and physical memory including computer-executable instructions that, when executed by the physical processor, cause the physical processor to (i) identify a plurality of video streams being transmitted via a shared connection with limited bandwidth, (ii) determine that viewership of a video stream within the plurality of video streams falls below a popularity threshold, (iii) increase bandwidth availability for a remainder of the plurality of video streams by ceasing transmission of the video stream with the viewership that falls below the popularity threshold, and (iv) continue to transmit the remainder of the plurality of video streams via the shared connection with the limited bandwidth.

Example 11: The system of example 10, where determining that the viewership of the video stream within the plurality of video streams falls below the popularity threshold includes determining that the video stream has the lowest viewership out of all video streams in the plurality of video streams.

Example 12: The system of examples 10-11, where wherein determining that the viewership of the video stream within the plurality of video streams falls below the popularity threshold includes determining that the viewership of the video stream falls below at least one of a predetermined number of users or a predetermined percentage of total viewership of the plurality of video streams.

Example 13: The system of examples 10-12, where determining that the viewership of the video stream within the plurality of video streams falls below the popularity threshold includes predicting an expected near-future popularity of the video stream and determining that the expected near-future popularity of the video stream falls below the popularity threshold.

Example 14: The system of examples 10-13, where increasing the bandwidth availability for the remainder of the plurality of video streams by ceasing transmission of the video stream is in response to detecting that the limited bandwidth for the shared connection has decreased.

Example 15: The system of examples 10-14, where detecting that the limited bandwidth for the shared connection has decreased includes determining that the limited bandwidth has decreased to below a predetermined threshold for available bandwidth.

Example 16: The system of examples 10-15, where detecting that the limited bandwidth for the shared connection has decreased includes calculating that a quality level of the plurality of video streams will be reduced if an entirety of the plurality of video streams are transmitted via the decreased bandwidth.

Example 17: The system of examples 10-16, where the computer-executable instructions cause the physical processor to identify a high-resolution video stream that has a highest resolution within the plurality of video streams and increase bandwidth availability by ceasing transmission of the high-resolution video stream.

Example 18: The system of examples 10-17, where the plurality of video streams include a plurality of real-time video streams of a live event.

Example 19: A non-transitory computer-readable medium may include one or more computer-readable instructions that, when executed by at least one processor of a computing device, cause the computing device to (i) identify a plurality of video streams being transmitted via a shared connection with limited bandwidth, (ii) determine that viewership of a video stream within the plurality of video streams falls below a popularity threshold, (iii) increase bandwidth availability for a remainder of the plurality of video streams by ceasing transmission of the video stream with the viewership that falls below the popularity threshold, and (iv) continue to transmit the remainder of the plurality of video streams via the shared connection with the limited bandwidth.

Example 20: The computer-readable medium of example 19, where determining that the viewership of the video stream within the plurality of video streams falls below the popularity threshold includes determining that the video stream has the lowest viewership out of all video streams in the plurality of video streams.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
identifying a plurality of video streams being transmitted via a plurality of devices that transmit data to a network over a shared connection with limited bandwidth that is subject to fluctuations in maximum bandwidth, the maximum bandwidth representing a maximum possible amount of data that can be transmitted over the shared connection per unit time;
detecting that the maximum bandwidth of the shared connection has decreased;
determining, in response to detecting that the maximum bandwidth of the shared connection has decreased, that viewership of a video stream within the plurality of video streams falls below a popularity threshold;
increasing bandwidth availability for a remainder of the plurality of video streams by ceasing transmission of the video stream with the viewership that falls below the popularity threshold; and
continuing to transmit the remainder of the plurality of video streams via the shared connection with the limited bandwidth.

2. The computer-implemented method of claim 1, wherein determining that the viewership of the video stream within the plurality of video streams falls below the popularity threshold comprises determining that the video stream has the lowest viewership out of all video streams in the plurality of video streams.

3. The computer-implemented method of claim 1, wherein determining that the viewership of the video stream within the plurality of video streams falls below the popularity threshold comprises determining that the viewership of the video stream falls below at least one of:
a predetermined number of users; or
a predetermined percentage of total viewership of the plurality of video streams.

4. The computer-implemented method of claim 1, wherein determining that the viewership of the video stream within the plurality of video streams falls below the popularity threshold comprises:
predicting an expected near-future popularity of the video stream; and
determining that the expected near-future popularity of the video stream falls below the popularity threshold.

5. The computer-implemented method of claim 1, further comprising resuming, in response to detecting that the maximum bandwidth of the shared connection has increased, transmission of the video stream with the viewership that falls below the popularity threshold.

6. The computer-implemented method of claim 1, wherein detecting that the maximum bandwidth for the shared connection has decreased comprises determining that the maximum bandwidth has decreased to below a predetermined threshold for available bandwidth.

7. The computer-implemented method of claim 1, wherein detecting that the maximum bandwidth for the shared connection has decreased comprises calculating that a quality level of the plurality of video streams will be reduced if an entirety of the plurality of video streams are transmitted via the decreased maximum bandwidth.

8. The computer-implemented method of claim 1, further comprising:
identifying a high-resolution video stream that has a highest resolution within the plurality of video streams; and
increasing bandwidth availability by ceasing transmission of the high-resolution video stream.

9. The computer-implemented method of claim 1, wherein the plurality of video streams comprises a plurality of real-time video streams of a live event.

10. A system comprising:
at least one physical processor;
physical memory comprising computer-executable instructions that, when executed by the physical processor, cause the physical processor to:
identify a plurality of video streams being transmitted via a plurality of devices that transmit data to a network over a shared connection with limited bandwidth that is subject to fluctuations in maximum bandwidth, the maximum bandwidth representing a maximum possible amount of data that can be transmitted over the shared connection per unit time;
detect that the maximum bandwidth of the shared connection has decreased;
determine, in response to detecting that the maximum bandwidth of the shared connection has decreased, that viewership of a video stream within the plurality of video streams falls below a popularity threshold;
increase bandwidth availability for a remainder of the plurality of video streams by ceasing transmission of the video stream with the viewership that falls below the popularity threshold; and
continue to transmit the remainder of the plurality of video streams via the shared connection with the limited bandwidth.

11. The system of claim 10, wherein determining that the viewership of the video stream within the plurality of video streams falls below the popularity threshold comprises determining that the video stream has the lowest viewership out of all video streams in the plurality of video streams.

12. The system of claim 10, wherein determining that the viewership of the video stream within the plurality of video streams falls below the popularity threshold comprises determining that the viewership of the video stream falls below at least one of:
a predetermined number of users; or
a predetermined percentage of total viewership of the plurality of video streams.

13. The system of claim 10, wherein determining that the viewership of the video stream within the plurality of video streams falls below the popularity threshold comprises:
predicting an expected near-future popularity of the video stream; and
determining that the expected near-future popularity of the video stream falls below the popularity threshold.

14. The system of claim 10, further comprising resuming, in response to detecting that the maximum bandwidth of the shared connection has increased, transmission of the video stream with the viewership that falls below the popularity threshold.

15. The system of claim 10, wherein detecting that the maximum bandwidth for the shared connection has decreased comprises determining that the maximum bandwidth has decreased to below a predetermined threshold for available bandwidth.

16. The system of claim 10, wherein detecting that the limited bandwidth for the shared connection has decreased comprises calculating that a quality level of the plurality of video streams will be reduced if an entirety of the plurality of video streams are transmitted via the decreased maximum bandwidth.

17. The system of claim 10, wherein the computer-executable instructions cause the physical processor to:
identify a high-resolution video stream that has a highest resolution within the plurality of video streams; and
increase bandwidth availability by ceasing transmission of the high-resolution video stream.

18. The system of claim 10, wherein the plurality of video streams comprises a plurality of real-time video streams of a live event.

19. A non-transitory computer-readable medium comprising one or more computer-readable instructions that, when executed by at least one processor of a computing device, cause the computing device to:
identify a plurality of video streams being transmitted via a plurality of devices that transmit data to a network over a shared connection with limited bandwidth that is subject to fluctuations in maximum bandwidth, the maximum bandwidth representing a maximum possible amount of data that can be transmitted over the shared connection per unit time;
detect that the maximum bandwidth of the shared connection has decreased;
determine, in response to detecting that the maximum bandwidth of the shared connection has decreased, that viewership of a video stream within the plurality of video streams falls below a popularity threshold;
increase bandwidth availability for a remainder of the plurality of video streams by ceasing transmission of the video stream with the viewership that falls below the popularity threshold; and
continue to transmit the remainder of the plurality of video streams via the shared connection with the limited bandwidth.

20. The computer-readable medium of claim 19, wherein determining that the viewership of the video stream within the plurality of video streams falls below the popularity threshold comprises determining that the video stream has the lowest viewership out of all video streams in the plurality of video streams.

* * * * *